United States Patent
Wright et al.

(10) Patent No.: US 8,065,349 B2
(45) Date of Patent: Nov. 22, 2011

(54) METHOD AND APPARATUS FOR PERFORMING CONCURRENT GARBAGE COLLECTION

(75) Inventors: Gregory M. Wright, Mountain View, CA (US); Mario I. Wolczko, San Carlos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 686 days.

(21) Appl. No.: 12/165,024

(22) Filed: Jun. 30, 2008

(65) Prior Publication Data

US 2009/0327374 A1 Dec. 31, 2009

(51) Int. Cl.
*G06F 17/30* (2006.01)

(52) U.S. Cl. ......................................................... 707/818

(58) Field of Classification Search ........... 707/999.206, 707/695, 813–820
See application file for complete search history.

(56) References Cited

U.S. PATENT DOCUMENTS

| | | | | |
|---|---|---|---|---|
| 5,088,036 | A * | 2/1992 | Ellis et al. | 707/999.206 |
| 5,930,807 | A * | 7/1999 | Ebrahim et al. | 707/999.206 |
| 6,671,707 | B1 * | 12/2003 | Hudson et al. | 707/999.206 |
| 6,845,385 | B1 * | 1/2005 | Hennessey | 707/999.206 |
| 6,925,637 | B2 * | 8/2005 | Thomas et al. | 717/151 |
| 7,069,281 | B2 * | 6/2006 | Garthwaite | 707/999.206 |
| 7,421,539 | B1 * | 9/2008 | Seidl et al. | 711/133 |
| 7,716,192 | B2 * | 5/2010 | Petrank et al. | 707/695 |
| 2006/0155791 | A1 * | 7/2006 | Tene et al. | 707/206 |
| 2008/0162611 | A1 * | 7/2008 | Wolczko et al. | 707/206 |

OTHER PUBLICATIONS

Lorenz Huelsbergen & James R. Larus, "A Concurrent Copying Garbage Collector for Languages that Distinguish (Im)mutable Data", 4th ACM PPOPP, Jun. 1993, pp. 73-82.*
Filip Pizlo et al., "Hierarchical Real-time Garbage Collection", ACM LCTES, Jun. 13-15, 2007, pp. 123-133.*
Antony L. Hosking, "Portable, Mostly-Concurrent, Mostly-Copying Garbage Collection for Multi-Processors", ACM ISMM, Jun. 10-11, 2006, pp. 40-51.*
Greg Wright, Matthew L. Seidel & Mario Wolczko, "An Object-aware Memory Architecture", SMLI TR-2005-143, Feb. 2005, pp. 1-31.*

* cited by examiner

*Primary Examiner* — Cheryl Lewis
*Assistant Examiner* — Scott A Waldron
(74) *Attorney, Agent, or Firm* — Park, Vaughan, Fleming & Dowler LLP

(57) ABSTRACT

The present invention provides a system that facilitates performing concurrent garbage collection. During operation, the system executes a first mutator thread. While executing the first mutator thread, the system performs a garbage-collection operation using a garbage-collector thread. Performing the garbage-collection operation involves: discovering a live object in a from-space, which is being collected; creating a copy of the live object to a to-space, where live objects are copied to during garbage collection; and replacing the live object in the from-space with a forwarding pointer which points to a location of the copy of the live object in the to-space.

24 Claims, 12 Drawing Sheets

CONCURRENT GARBAGE-COLLECTION ENVIRONMENT 200

METHOD AND APPARATUS FOR PERFORMING CONCURRENT GARBAGE COLLECTION

BACKGROUND

1. Field of the Invention

The present invention relates to garbage collectors. More specifically, the present invention relates to a method and an apparatus for facilitating concurrent garbage collection.

2. Related Art

As object-oriented programming languages become more widely used, computer systems are being designed to manipulate objects more efficiently. One of the toughest challenges in efficiently manipulating objects is garbage collection. Non-concurrent, or "stop the world," garbage collectors, which are in common use today, suffer from the problem that the entire application stops responding while a garbage-collection operation is in progress.

In contrast, concurrent garbage collectors can reclaim heap memory while the main application program ("mutator") threads continue to execute. However, concurrent garbage collectors suffer from difficult synchronization problems. For example, the garbage collector must not be confused by the concurrent heap mutations and accidentally reclaim live data. These concurrency problems can be solved by using "garbage-collection (GC) barriers," snippets of code that are executed by the mutators to ensure correctness of the garbage-collection operation. Typically, these GC barriers have a substantial cost in terms of performance and code size.

Hence, what is needed is a method and an apparatus for performing concurrent garbage collection without the problems listed above.

SUMMARY

One embodiment of the present invention provides a system that facilitates performing concurrent garbage collection. During operation, the system executes a first mutator thread. While executing the first mutator thread, the system performs a garbage-collection operation using a garbage-collector thread. Performing the garbage-collection operation involves: discovering a live object in a from-space, which is being collected; marking cache lines comprising the live object in from-space as "forwarded," which prevents any mutator threads from touching the cache lines; creating a copy of the live object to a to-space, where live objects are copied to during garbage collection; and replacing the live object in the from-space with a forwarding pointer which points to a location of the copy of the live object in the to-space.

In some embodiments of the present invention, performing the garbage-collection operation further involves: examining the copy of the live object in the to-space to identify a pointer to a location in the from-space; if such a pointer is identified, determining if a second live object exists at the location in the from-space, and if so, moving the second live object to the to-space; and replacing the pointer to the location in the from-space with a pointer to a corresponding location in the to-space.

In some embodiments of the present invention, the system moves the second live object to the to-space by: creating a copy of the second live object to the to-space; replacing the second live object in the from-space with a second forwarding pointer which points to a location of the copy of the second live object in the to-space; examining the copy of the second live object in the to-space to identify a pointer to a second location in the from-space; if such a pointer is identified, determining if a third live object exists at the second location in the from-space, and if so, moving the third live object to the to-space; and replacing the pointer to the second location in the from-space with a pointer to a corresponding location in the to-space.

One embodiment of the present invention provides a system that facilitates performing concurrent garbage collection. During operation, the system executes a first mutator thread. While executing the first mutator thread, the system performs a garbage-collection operation using a garbage-collector thread. Performing the garbage-collection operation involves: discovering a live object in a from-space, which is being collected; marking cache lines comprising the live object in from-space as "forwarded," which prevents any mutator threads from touching the cache lines; creating a copy of the live object to a to-space, where live objects are copied to during garbage collection; replacing the live object in the from-space with a forwarding pointer which points to a location of the copy of the live object in the to-space; determining if the first mutator thread holds any additional references to the from-space; if so, leaving the first mutator thread marked as "dirty," wherein dirty is the initial state for mutator threads; and if not, marking the first mutator thread as "clean."

In some embodiments of the present invention, the system copies the live object to the to-space using a collector or a mutator operating on behalf of the collector.

In some embodiments of the present invention, performing the garbage-collection operation involves cleaning one or more cache lines comprising the to-space copy of the live object.

In some embodiments of the present invention, cleaning a cache line involves: marking the cache line as "being cleaned," wherein the initial state of the cache line is "dirty;" determining if any pointers in the cache line point to the from-space; if so, copying objects pointed to by the pointers to the to-space and adjusting the pointers to point to the copies of the objects in the to-space; and once all of the pointers in the cache line point to the to-space, marking the cache line as "clean."

In some embodiments of the present invention, the state of the cache line is stored with the coherence state of the cache line.

In some embodiments of the present invention, the system determines that the second mutator thread is going to perform a read operation on a cache line. If the second mutator thread is marked as dirty and the cache line is marked as dirty or being cleaned, the system allows the read operation. If the second mutator thread is marked as dirty and the cache line is marked as forwarded, the system traps the read operation. If the second mutator thread is marked as dirty and the cache line is marked as clean, the system allows the read operation. If the second mutator thread is marked as clean and the cache line is marked as dirty or being cleaned, the system traps the read operation. If the second mutator thread is marked as clean and the cache line is marked as forwarded, the system throws an exception. Finally, if the second mutator thread is marked as clean and the cache line is marked as clean, the system allows the read operation.

In some embodiments of the present invention, the system determines that the second mutator thread is going to perform a write operation on a cache line. If the second mutator thread is marked as dirty and the cache line is marked as dirty or being cleaned, the system allows the write operation and sets the cache line to dirty. If the second mutator thread is marked as dirty and the cache line is marked as forwarded, the system traps the write operation. If the second mutator thread is marked as dirty and the cache line is marked as clean, the system allows the write operation and sets the cache line to dirty. If the second mutator thread is marked as clean and the cache line is marked as dirty or being cleaned, the system allows the write operation. If the second mutator thread is marked as clean and the cache line is marked as forwarded, the system throws an exception. Finally, if the second mutator thread is marked as clean and the cache line is marked as clean, the system allows the write operation.

In some embodiments of the present invention, once all threads have been marked as clean, the system clears the from-space, and changes a garbage-collection phase so that the from-space becomes the to-space and the to-space becomes the from-space for a subsequent garbage-collection operation.

In some embodiments of the present invention, the garbage-collection phase is set per mutator thread.

BRIEF DESCRIPTION OF THE FIGURES

Table 1 illustrates garbage collection barrier actions in accordance with an embodiment of the present invention.

Table 2 illustrates cache line state according to phase in accordance with an embodiment of the present invention.

DETAILED DESCRIPTION

Figure 1:
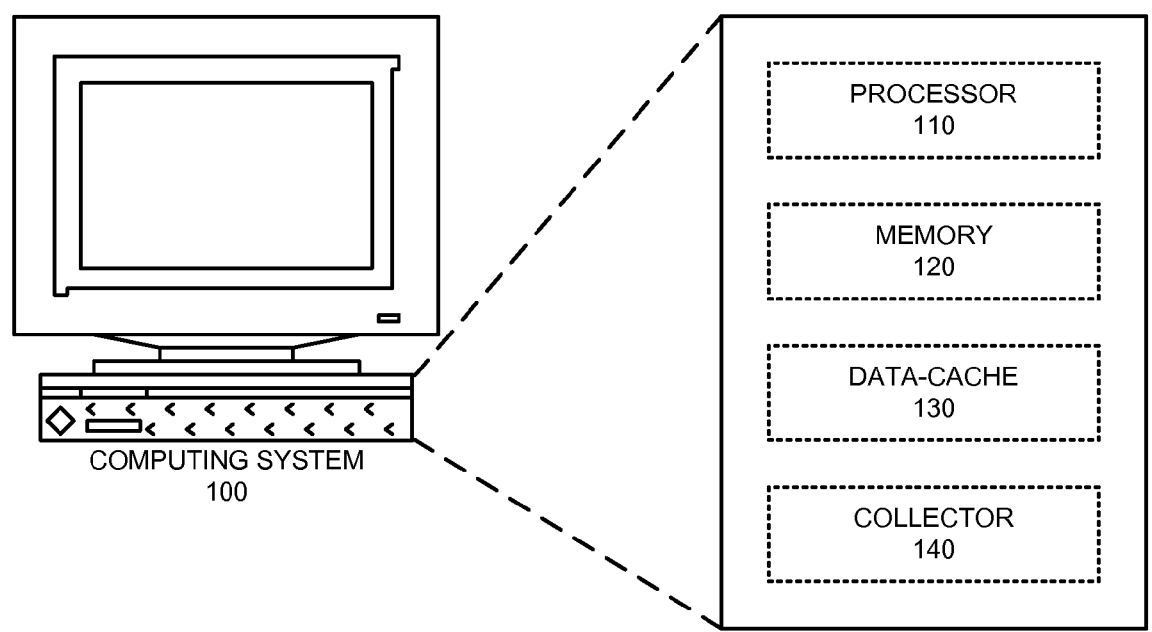
FIG. 1 illustrates a computing system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention provide a system wherein one or more garbage-collector threads perform garbage-collection operations while other mutator (application program) threads continue to execute. These embodiments do not suffer from "stop the world" situations that occur with non-concurrent garbage collectors, nor do they incur the performance penalty of other concurrent garbage collectors. This is accomplished via changes to the instruction set and memory hardware of a computer system to enable more efficient garbage-collection (GC) barriers.

Embodiments of the present invention use a concurrent semi-space copying technique. The basic semi-space technique proceeds as follows. Initially, all objects are in the 'from' semi-space (the 'to' semi-space is empty). As the garbage collector discovers that objects are live, the garbage collector copies the live objects blindly from the from-space into the to-space, leaving behind a forwarding pointer in the old location indicating the location where the object was moved. Note that the to-space copy may still contain pointers back into the from-space.

A second wave of processing follows along inside the to-space, examining the fields in the copied objects. Whenever the garbage collector encounters a pointer into from-space, it either indicates a newly encountered object to copy, or an object which has already been copied. In either case, the pointer into from-space is replaced by the equivalent pointer into to-space. Eventually there are no more live objects to copy, and all the pointers contained in to-space objects point into to-space. At that time, from-space contains only garbage and can be recycled.

Note that roots for the garbage collector include mutator registers and stack locations, plus any references in old-space which point to new-space objects (the old→new references are tracked by an inter-generational write barrier). All of the roots are also updated to point to the new to-space copies.

The garbage collector moves objects and updates the references to the objects. So, as well as dealing with the complexities of concurrent garbage collection, embodiments of the present invention also have a concurrent relocation problem. These embodiments should ensure that a mutator does not use the old from-space version of the object when it has been moved to-space.

Concurrency is controlled by hardware GC barriers built into the mutator's load and store instructions. The barriers compare the state of the mutator thread with some metadata stored alongside each cache line (e.g., with the ECC tags). Note that the GC bits are part of the coherent state of the cache line, and may be modified by certain write barriers (but not read barriers), so the usual coherence mechanisms apply just as they do to data.

A mutator thread, for garbage collection purposes, is in one of two states: Dirty or Clean. A Dirty mutator thread may hold or use references to either from-space or to-space objects. However, a Clean mutator thread may only have references into to-space (so the actions of a Clean mutator cannot interfere with the termination of the garbage collector).

A cache line exists in one of four states: Dirty, Clean, BeingCleaned or Forwarded. A Dirty cache line may contain pointers into from-space or to-space. A Clean cache line contains only pointers into to-space. The BeingCleaned intermediate state exists so that cache lines can be cleaned concurrently: it acts as Clean with respect to stores and Dirty with respect to loads. Finally, the Forwarded state prevents mutators from touching the cache line at all. The Forwarded state indicates part of an object in from-space which has already been moved to-space. In principle, the four states apply to all cache lines in the heap; however, only from-space lines will ever be genuinely Forwarded. Note that Java™ stacks are private to their threads, so (like registers) they do not need garbage collection concurrency protection. The four cache line states can be encoded in two bits per cache line, although the interpretation of the bits is different in even and odd garbage-collection cycles (this is described in more detail below). There is one bit per thread (or core/processor if desired) to indicate the garbage-collection phase. If the phase bit is not per-thread, then the garbage collector should also invert the interpretation of the thread's Dirty/Clean bit.

The following GC barrier actions apply only to reads and writes of references; non-reference loads and stores do not care about the Clean/Dirty state of the thread or cache line, but will still trap if a mutator attempts an operation on a Forwarded cache line. New instructions (LDR/STR) distinguish reference loads or stores from the usual LDX/STX.

TABLE 1

| | Cache Line State | | |
|---|---|---|---|
| Thread State | Dirty/BeingCleaned | Forwarded | Clean |
| Dirty | Reads: OK<br>Writes: set cache line to Dirty | Trap | Reads: OK<br>Writes: set cache line to Dirty |
| Clean | Reads: Trap<br>Writes: OK | Error | Reads: OK<br>Writes: OK |
| (GC) | Reads and writes OK | | |

The garbage-collection barrier operations are very simple: writes by a Dirty mutator may set a cache line to Dirty (plus there are two cases where a trap must be delivered). First, a thread attempting to touch a Forwarded cache line must be prevented from doing so: this is the out-of-date from-space version of an object which has been moved to-space. The trap handler will find the forwarding pointer in from-space and update the register containing the from-space reference before re-trying the offending load or store. Secondly, a Clean thread is not allowed to read from a Dirty or BeingCleaned cache line. This might lead to the Clean thread seeing a reference which is unknown to the garbage collector. The trap handler here will either clean the cache line itself (helping the collector along), or just wait for the collector to get to it eventually (which could take some time). When the cache line is Clean, the operation may proceed. Note that the cleaning operation is described below.

Remembered Set

Note that the garbage collector, like any generational system, must be able to find old→new references easily. The remembered set is maintained by a logging store barrier: whenever a store-reference instruction is executed with a destination address which is in old space. This location can include a memory buffer, or a small number of registers inside the CPU which are flushed to memory by software when they fill.

Initial State

At the beginning of a garbage-collection cycle, every mutator thread is Dirty, all of from-space is Dirty, to-space is empty, cache lines in old-space containing pointers into from-space (i.e., roots) are Dirty, and the rest of the heap (old-space) may be either Dirty or Clean. This initial state is almost completely stable: the read and write barriers do not disturb anything, with the minor exception of stores into old-space which may silently set the cache line to Dirty.

Thread Cleaning and Root Processing

A garbage collection is actually initiated when a mutator is suspended at a safepoint and cleaned: that is, all from-space objects referenced from its registers and stack are forwarded to-space. Once that's done, the mutator's state is switched to Clean, and mutation can resume. From this point forward, this mutator will never see a reference into from-space, until the completion of the current garbage-collection phase. The remembered set log associated with this thread may also be handed off to the collector at this point.

As soon as one mutator has been cleaned, other mutators may start to see Forwarded cache lines. There is no need to suspend all of the mutators at the same time (no stop-the-world pause), although every mutator must be cleaned once before the GC cycle can end.

The other source of roots (apart from the mutator threads) is old→new references. At some point during the GC cycle, the collector iterates over this remembered set and cleans the old-space cache lines containing them. Cache line cleaning is described below.

Copying Objects

The collector (or sometimes a mutator acting on its behalf) copies objects from-space to-space as follows:

Allocate sufficient space for the object in to-space.

Iterate over the cache lines in from-space containing the object:

Set the cache line to Forwarded.

Copy each field in that cache line to-space (as Dirty).

Store the forwarding pointer (the new to-space address) into the header of the from-space version. (If there may be a race between multiple collector or mutator threads, this store should be a compare-and-swap (CAS) to ensure that only one actually makes the definitive to-space copy.)

Note that the Forwarded state (as marked in the cache lines) may run off the start or end of the object into adjacent objects.

Any mutator attempting to touch a field in the from-space version will trap upon seeing the Forwarded state. The trap handler will forward the reference as follows:

Check the object header to see whether a forwarding pointer has been installed.

If not: forward the object as described above (helping the collector along).

Fix up the offending register (identified by looking at the code for the exception PC) with the new to-space address.

Retry the operation.

Collector's Cleaning Pass

As soon as some objects are copied to-space, the collector is free to start transitive forwarding by cleaning to-space cache lines. The collector iterates over the to-space cache lines from the beginning, identifying the object fields containing references (either via the object's class, or by the sign of the offset for bidirectional objects). Cleaning a cache line means ensuring that it contains no pointers into from-space. The cleaning operation proceeds as follows:

Set the cache line to BeingCleaned.
For each reference field in the cache line:
   If the reference is a pointer into from-space: forward the reference (as with the mutator register case above).
   CAS the forwarded to-space reference into the field. There is no need to retry if the CAS fails.
If the cache line is still BeingCleaned, set the cache line to Clean (this is an atomic-type operation). Otherwise, the cleaning operation failed (because a Dirty mutator stored into the cache line). Whether to retry depends on why the cache line was being cleaned.

As long as some Dirty mutators exist, Clean (or BeingCleaned) cache lines may become dirty again because a Dirty mutator may store a reference into the cache line. The collector should therefore repeat the cleaning pass after all the mutators are cleaned, or indeed may choose to delay starting the cleaning pass until then. When there are no more Dirty mutators, each cleaning operation will complete successfully.

The cleaning pass may be parallelized easily over multiple collector threads, because the operation on each cache line is independent. The only issue is finding the references. A conventional semi-space layout is parseable from the beginning because objects are densely packed end-to-end, but the question is how to jump 'into the middle' and find references. If the semi-space was filled as multiple allocation buffers, then operation can proceed in parallel on each buffer, for example.

There is an interesting race if two threads try to clean the same cache line at once, while a Dirty thread also stores into the line (the state may go Dirty-BeingCleaned-Dirty-BeingCleaned-Clean, without in fact being completely clean). Thus, which thread is actually cleaning a particular cache line may require some synchronization as long as Dirty mutators exist. (An alternative way to avoid the race would be to have Dirty mutators trap and if necessary forward the individual datum when storing into a BeingCleaned cache line, which can remain BeingCleaned instead of becoming Dirty. This has the disadvantage of impeding those Dirty mutators which are heading toward a safepoint, thereby lengthening the period of overlap between Dirty and Clean mutators.)

Allocation

Mutators are free to continue to allocate during the collection cycle. A Dirty mutator may allocate into either from-space (if there is room) or to-space; the objects it creates will, of course, be Dirty when it stores into them. A Clean mutator may allocate only in to-space. When allocation buffers in to-space are zeroed, they should be set Clean before they are released to a mutator; the resulting state then ends up correct, whether Dirty or Clean mutators allocate into it. A block initializing store instruction can set the cache line state to agree with the thread's state.

Termination

When all of the mutators are Clean, and the collector's cleaning pass has reached the end of to-space, and old-space cache lines mentioned in the remembered set have been cleaned, the new-space GC is over. Every cache line containing a reference to new-space (except those in from-space, which do not matter) is now Clean, so there are no accessible references to from-space anywhere in the system.

At this point, it is possible for the mutators still to be taking occasional traps when reading from Dirty cache lines. These cache lines must be part of old-space, but they cannot contain any from-space references because the remembered set was cleaned; the Clean/Dirty state of old-space cache lines that are not mentioned in the remembered set is arbitrary, because the system should not touch the whole of old-space in each new-space collection cycle. Thus, the mutators may be taking spurious traps, but this does not affect termination. If performance suffers because of these traps, the system may (at extra expense) introduce a 'None' state for old-space cache lines, to indicate that there are no new-space references within.

From-space is now dead, and its contents will not be used again (it contains a mixture of Forwarded and Dirty cache lines). To-space contains only Clean cache lines, and old-space may contain a mixture of Clean or Dirty lines (with occasional transient BeingCleaned lines).

Phase Flip

With the garbage collection finished, the system can flip phase to start again. Swapping the roles of to-space and from-space is easy. Inverting the mutators' phase bits causes an interesting re-interpretation of all the cache line and mutator thread state bits:

TABLE 2

| Cache Line State Bits | Odd Phase | Even Phase |
|---|---|---|
| 00 | Dirty | Clean |
| 01 | BeingCleaned | |
| 10 | Clean | Dirty |
| 11 | Forwarded | |

As soon as a mutator 'sees' the inverted phase bit, it transmutes from being a Clean mutator operating on a mostly Clean memory into a Dirty mutator operating on a mostly Dirty memory. There is no need for the phase switch to occur on all mutators simultaneously: they do not interfere.

The state after all mutators' phase bits are flipped is very close to the initial quiescent state. The only remaining housekeeping is to ensure that all old-space cache lines mentioned in the remembered set are Dirty. It is enough for each mutator thread to iterate over old→new references which it has created since the last GC (these are in the thread's remembered set log), setting them to Dirty; this does not need to be done at a safepoint.

Computing Environment

FIG. 1 illustrates a computing system 100 in accordance with an embodiment of the present invention. Computing system 100 can generally include any type of computer system based on a microprocessor, a mainframe computer, a digital signal processor, a portable computing device, a personal organizer, a device controller, or a computational engine within an appliance.

Computing system 100 includes processor 110, memory 120, data-cache 130, and collector 140.

Concurrent Garbage Collection

Figure 2:
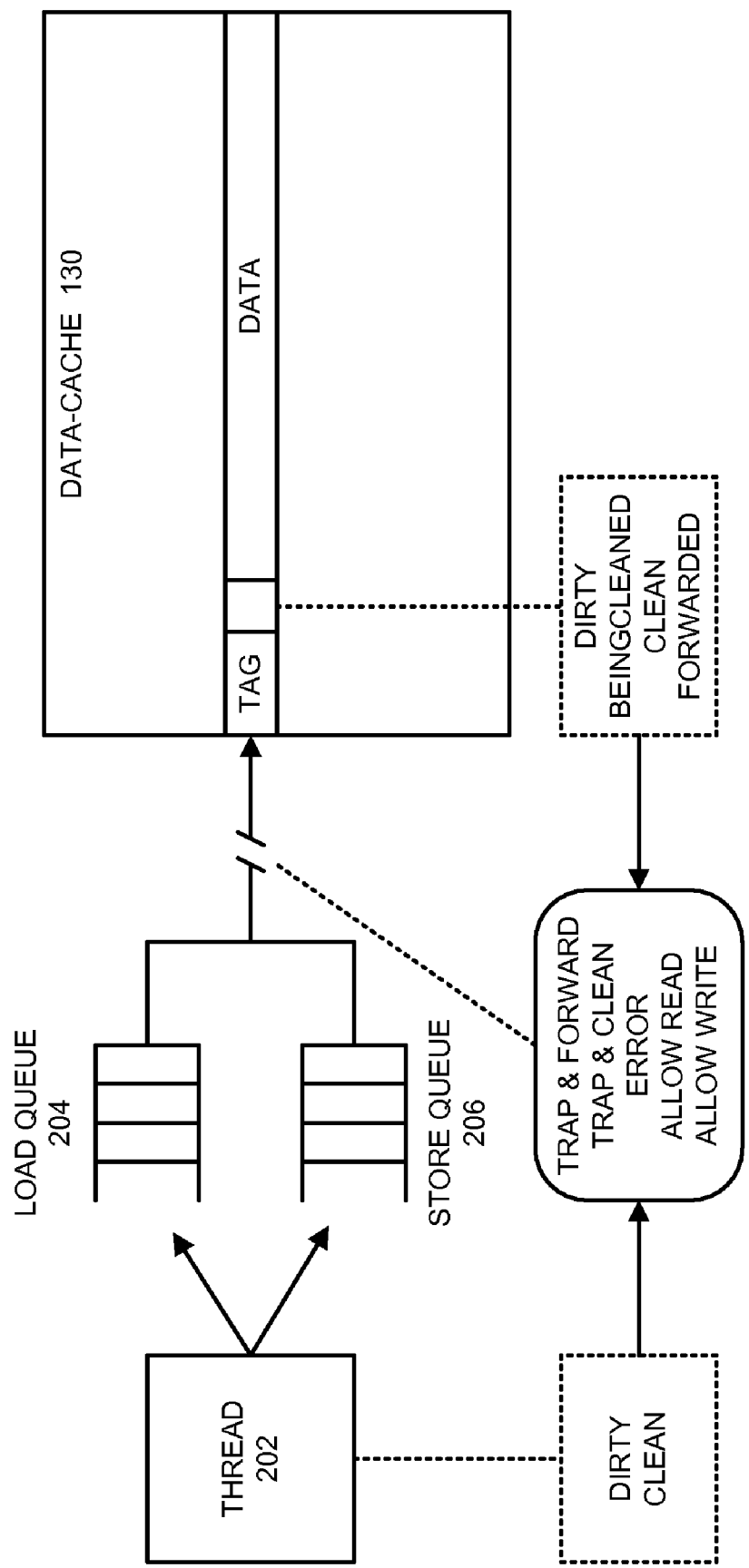
FIG. 2 illustrates concurrent garbage collection in accordance with an embodiment of the present invention.

FIG. 2 illustrates concurrent garbage-collection environment 200 in accordance with an embodiment of the present invention. Concurrent garbage-collection environment 200 includes thread 202, load queue 204, store queue 206, and data-cache 130. Note that thread 202 may continue to execute while collector 140 actively collects data-cache 130. As described previously, thread 202 may be marked as Dirty or Clean. Additionally, cache lines in data-cache 130 may be marked as Dirty, BeingCleaned, Clean, or Forwarded. The state of thread 202 and the state of cache lines in data-cache 130 determine the action taken by collector 140.

Semi-Space States

Figure 3A:
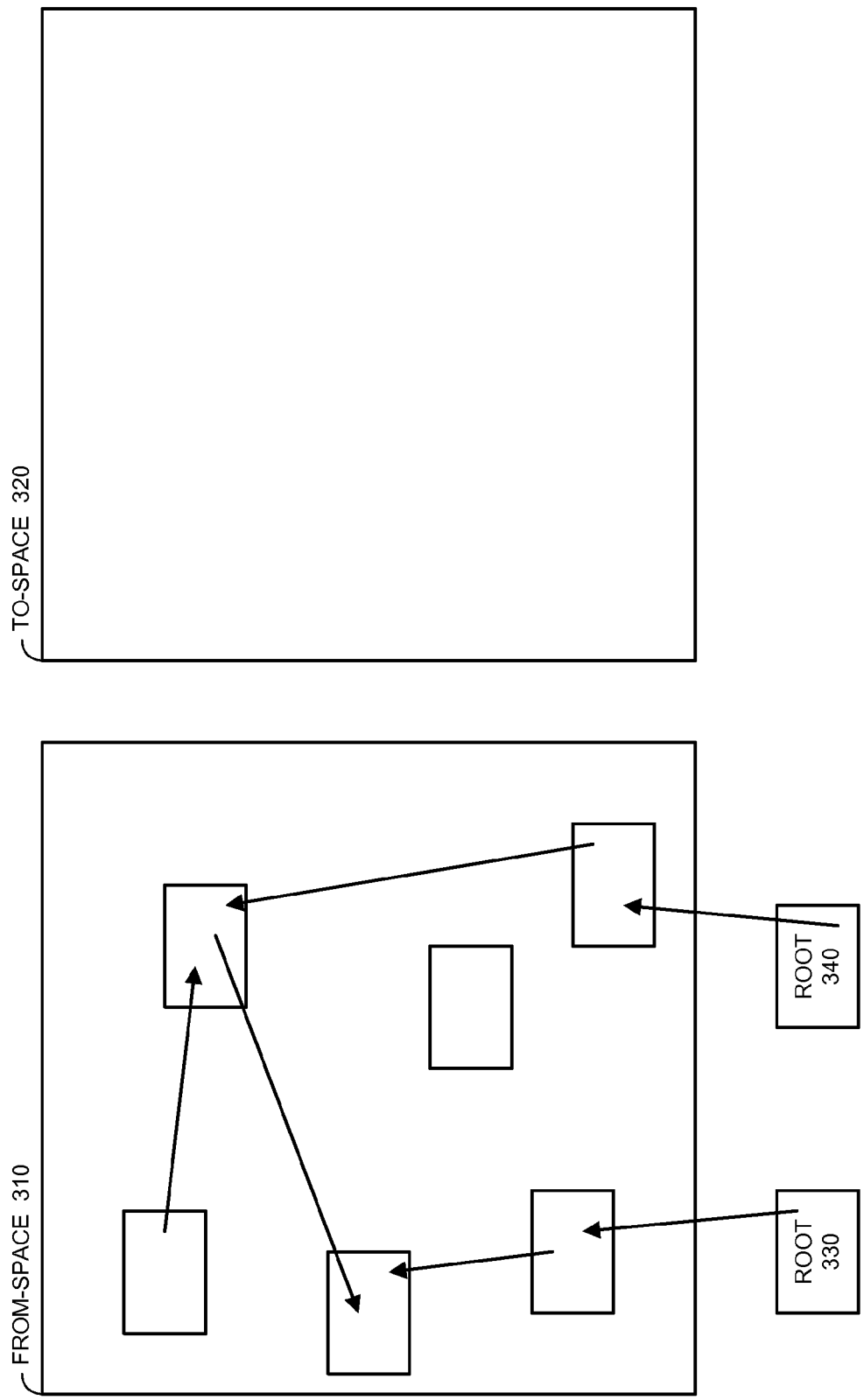
FIGS. 3A-3D illustrate semi-space states in accordance with an embodiment of the present invention.

FIGS. 3A-3D illustrate semi-space states in accordance with an embodiment of the present invention. FIG. 3A illustrates the initial state where all of the objects live in from-space 310 and to-space 320 is empty. During this state, all reads and writes are in from-space 310. All roots, such as root 330 and root 340, point into from-space 310.

Figure 3B:
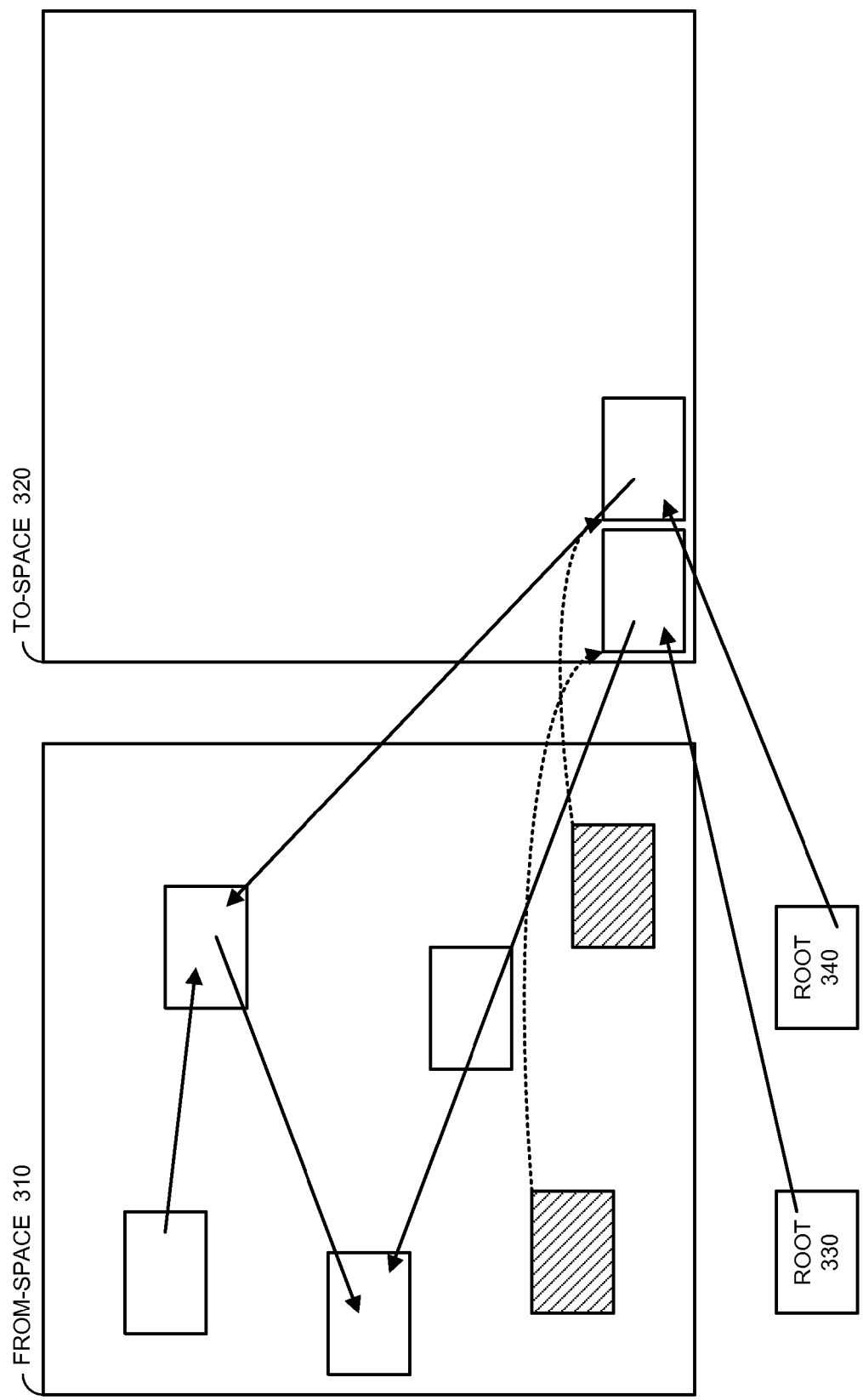

FIG. 3B illustrates the state where all of the objects referenced from the roots are copied to-space 320, and the root pointers are updated to point to-space 320.

Figure 3C:
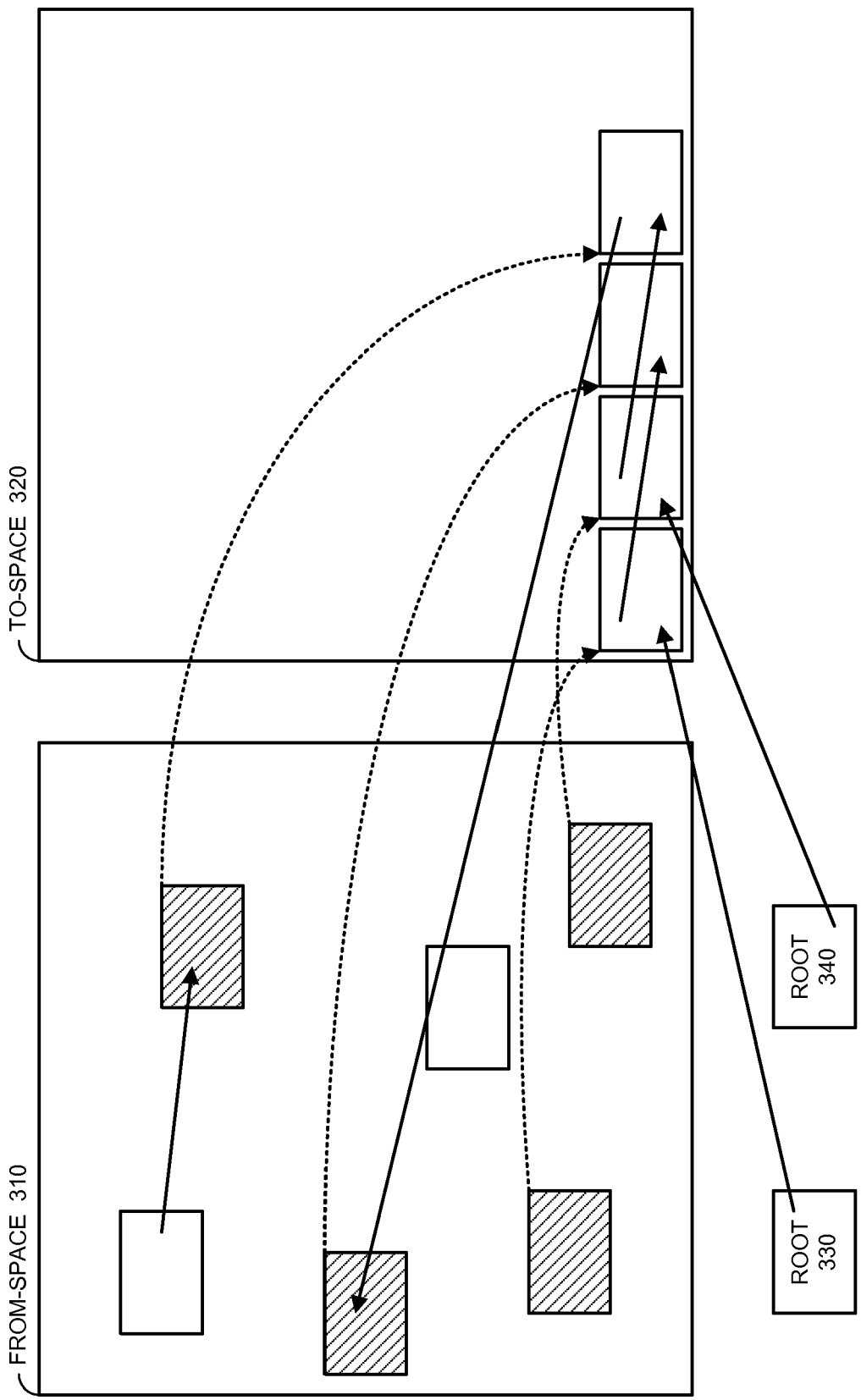

FIG. 3C illustrates the transitive-forwarding state where all of the pointers into from-space 310 from objects copied to-space 320 are located, and the corresponding objects are located and copied to-space 320. Note that this process is iterative, and continues until there are no more pointers in to-space 320 which point into from-space 310.

Figure 3D:
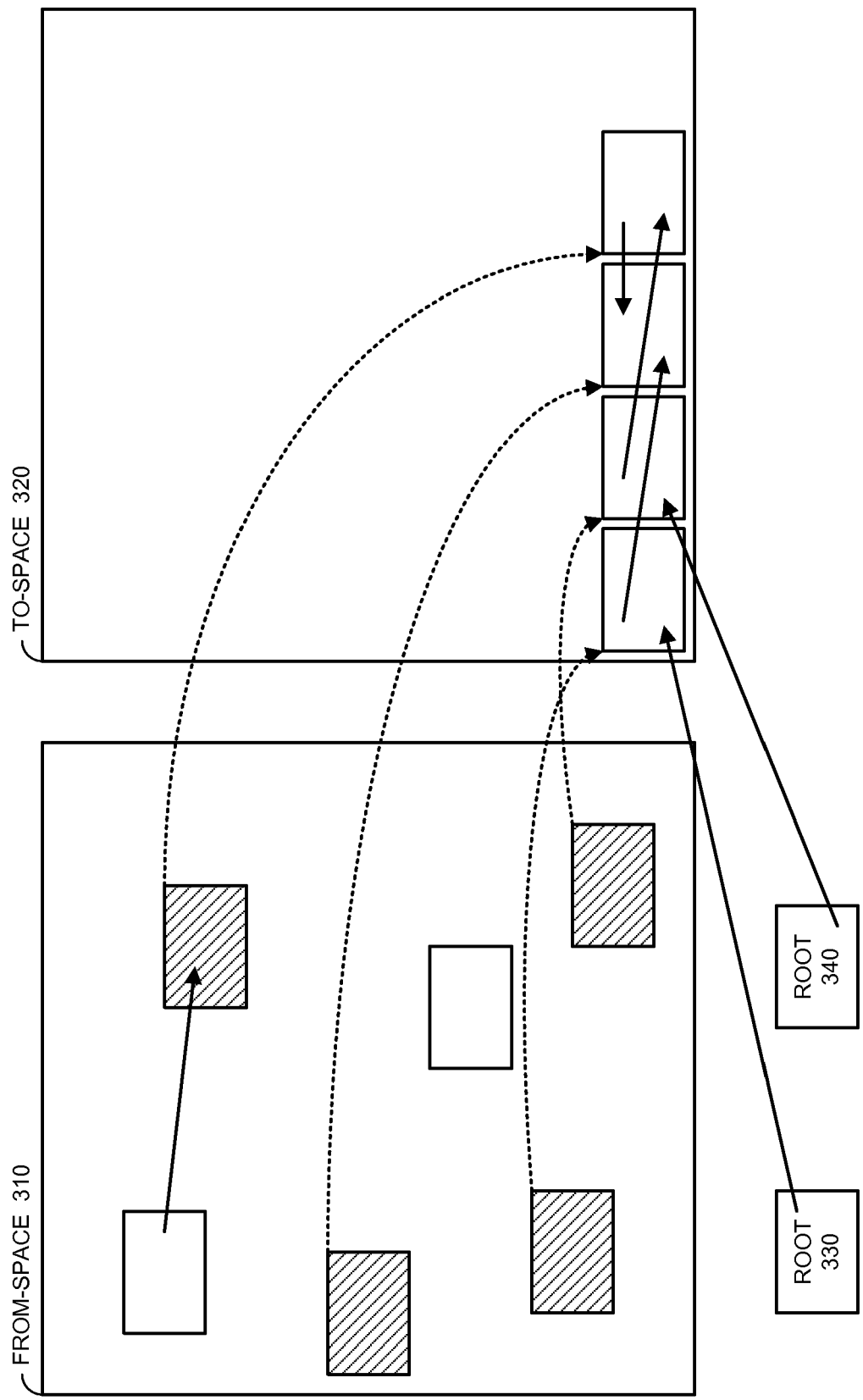

FIG. 3D illustrates the final state where all of the live objects have been copied into to-space 320, and from-space 310 only contains dead objects. At this state, from-space 310 can be wiped, and the phase can be flipped such that from-space 310 becomes the new to-space and to-space 320 becomes the new from-space.

Process of Concurrent Garbage Collection

Figure 4:
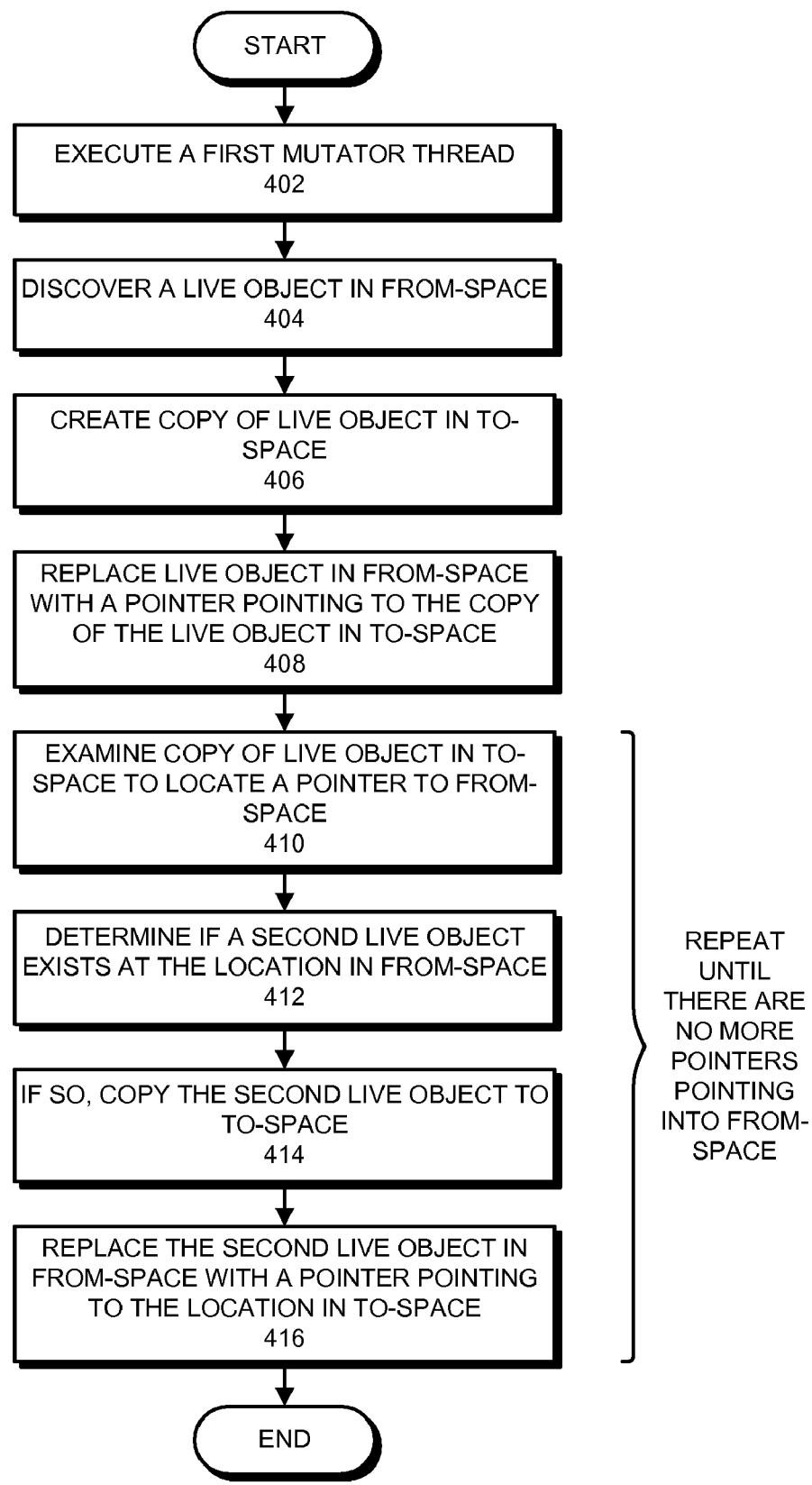
FIG. 4 presents a flowchart illustrating the process of concurrent garbage collection in accordance with an embodiment of the present invention.

FIG. 4 presents a flowchart illustrating the process of concurrent garbage collection in accordance with an embodiment of the present invention. During operation, the system executes a first mutator thread (operation 402). While executing the first mutator thread, the system performs a garbage-collection operation using a garbage-collector thread. Note that performing the garbage-collection operation involves: discovering a live object in a from-space 310, which is being collected (operation 404); creating a copy of the live object to a to-space 320, where live objects are copied to during garbage collection (operation 406); and replacing the live object in the from-space 310 with a forwarding pointer which points to a location of the copy of the live object in the to-space 320 (operation 408).

In some embodiments of the present invention, performing the garbage-collection operation further involves: examining the copy of the live object in the to-space 320 to identify a pointer to a location in the from-space 310 (operation 410); if such a pointer is identified, determining if a second live object exists at the location in the from-space 310 (operation 412), and if so, moving the second live object to the to-space 320 (operation 414); and replacing the pointer to the location in the from-space 310 with a pointer to a corresponding location in the to-space 320 (operation 416). Note that as described previously, this process repeats until there are no more pointers pointing into from-space 310.

Semi-Space States with Multiple Threads

FIGS. 5A-5E illustrate semi-space states with multiple threads in accordance with an embodiment of the present invention.

Figure 5A:
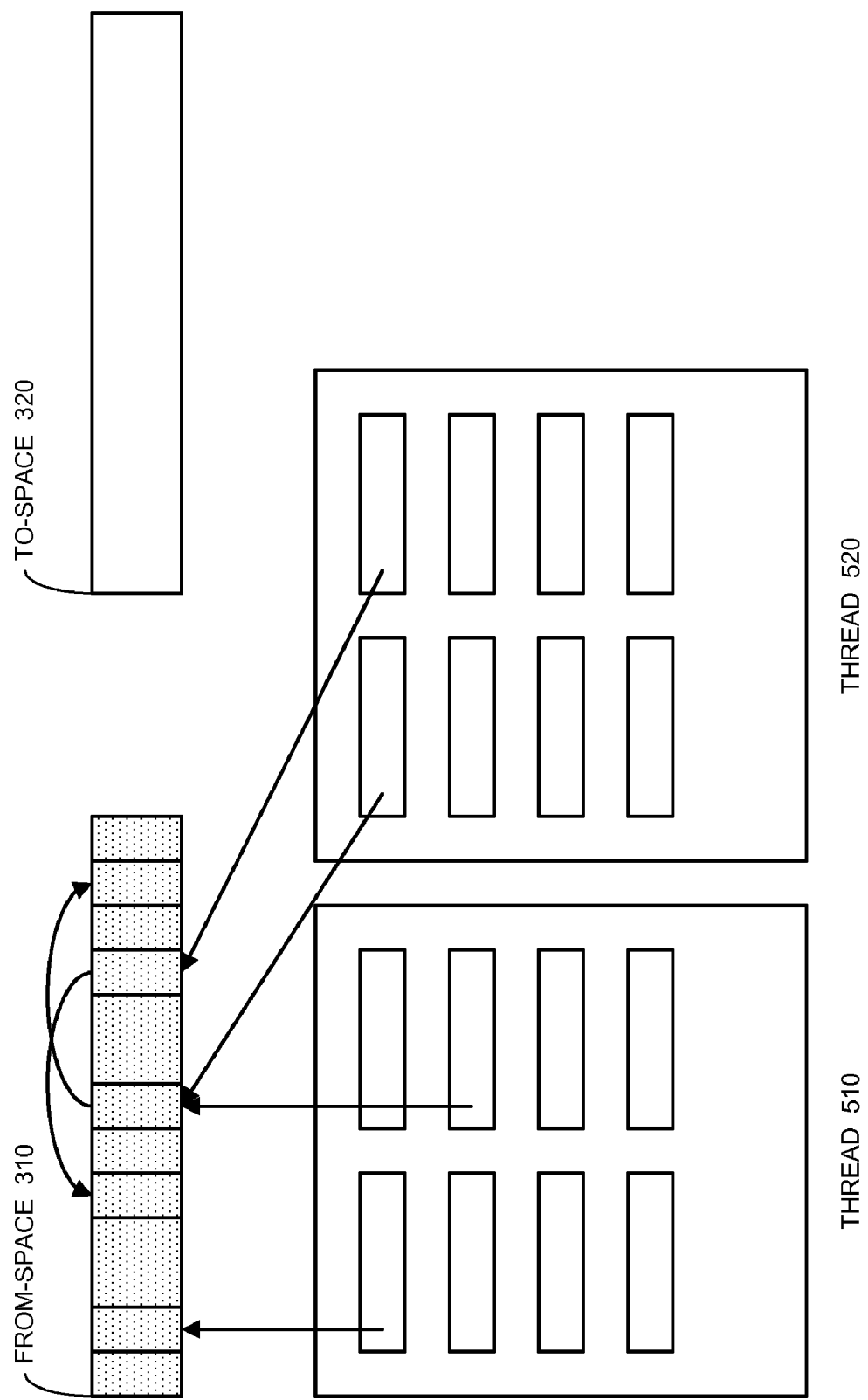
FIGS. 5A-5E illustrate semi-space states with multiple threads in accordance with an embodiment of the present invention.

FIG. 5A illustrates an initial state wherein both threads 510 and 520 are operating entirely within from-space 310. As illustrated, thread 510 includes pointers pointing to two objects in from-space 310, and thread 520 includes pointers pointing to two objects in from-space 310.

Figure 5B:
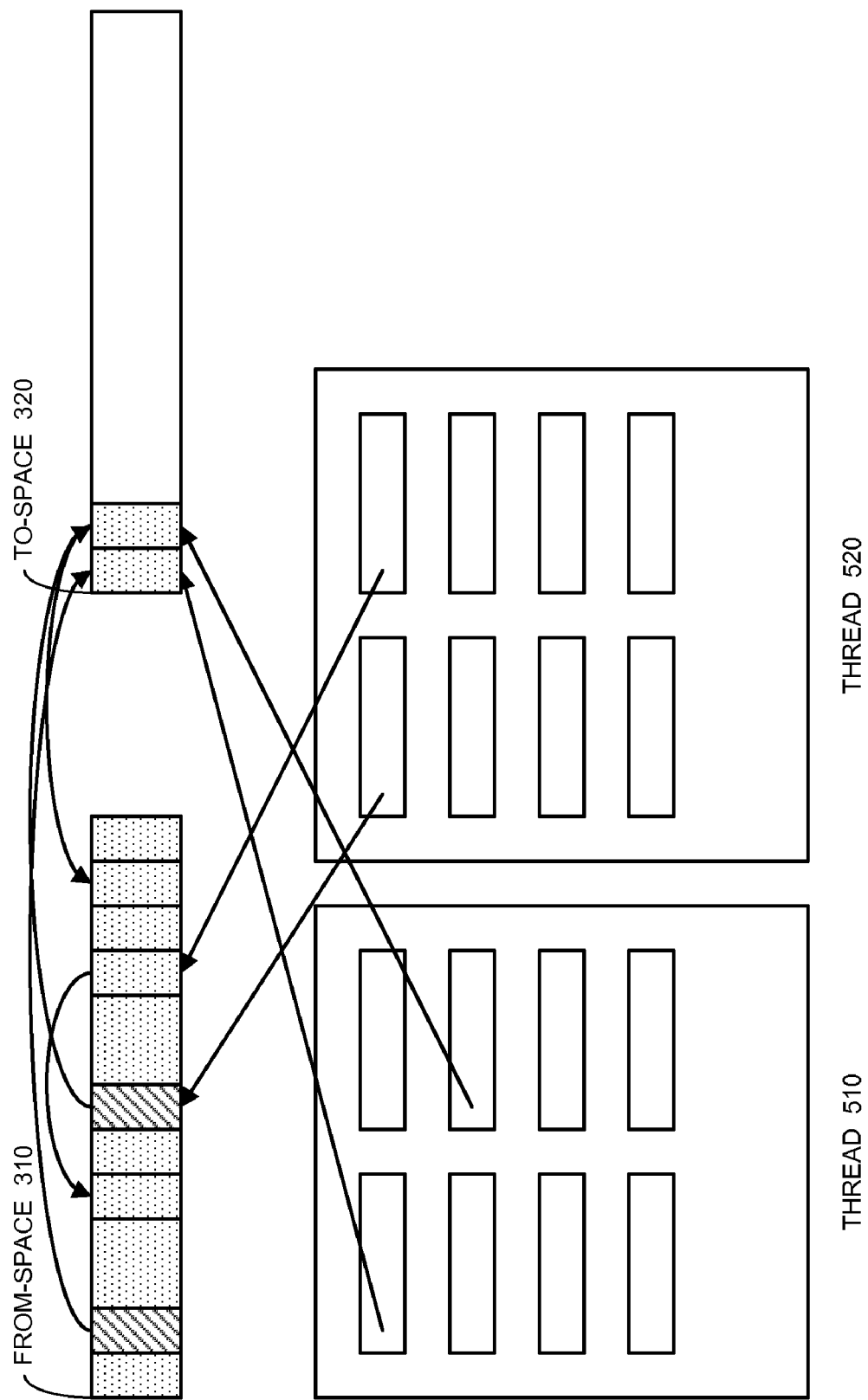

FIG. 5B illustrates a state where collector 140 has cleaned thread 510 by copying the two objects referenced by thread 510 to-space 320. Additionally, collector 140 has replaced the copied objects in from-space 310 with forwarding pointers that point to the location of the copied objects in to-space 320. From this point on, thread 510 only sees references to-space 320.

Figure 5C:
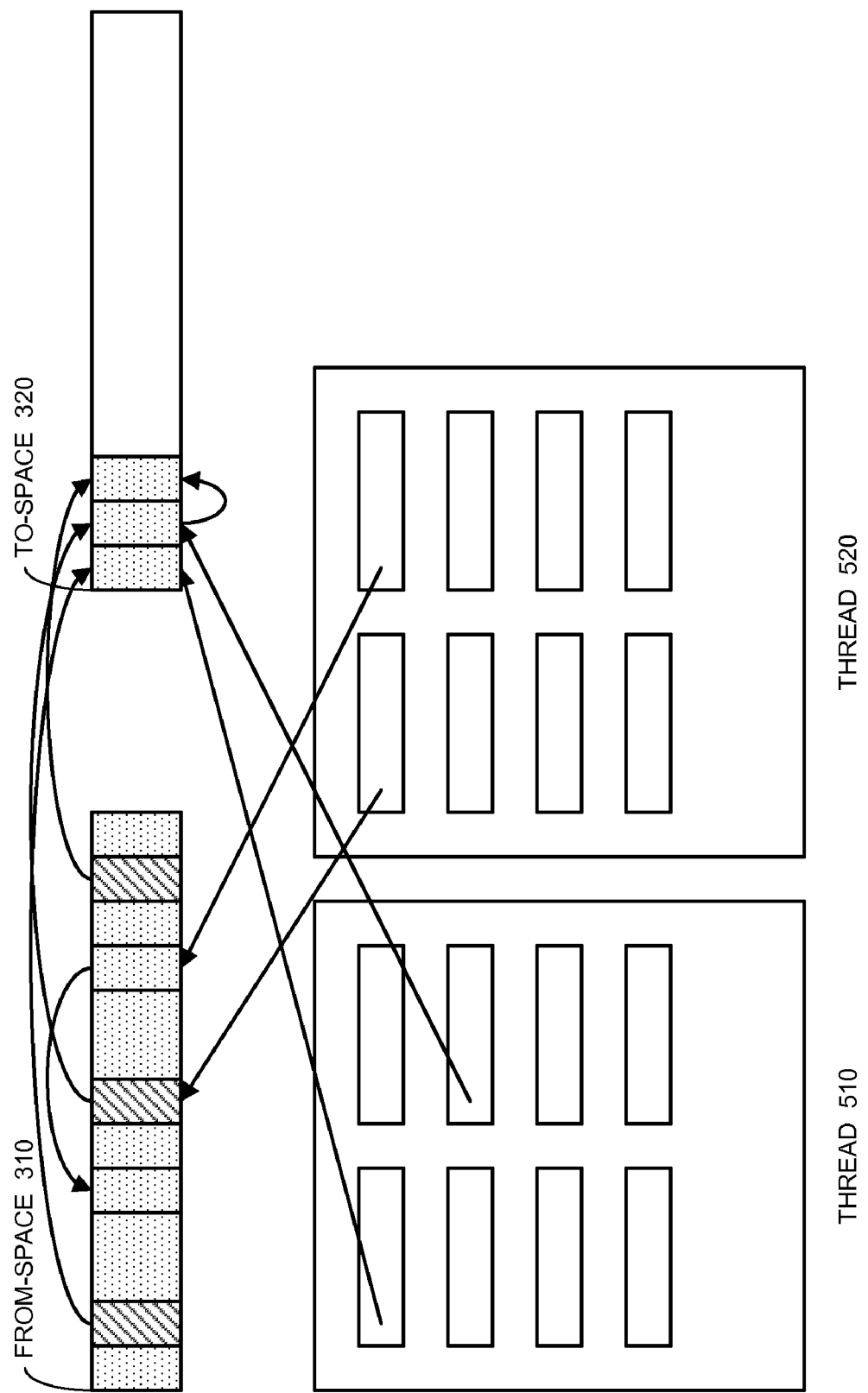

FIG. 5C illustrates the state where the system encounters thread 510's read barrier. During execution of thread 510 or thread 520, a pointer was encountered in to-space 320 that points into from-space 310. During this state, thread 510 will trap and clean when reading a Dirty line. Additionally, both threads 510 and 520 will trap and forward when touching a Forwarded line.

Figure 5D:
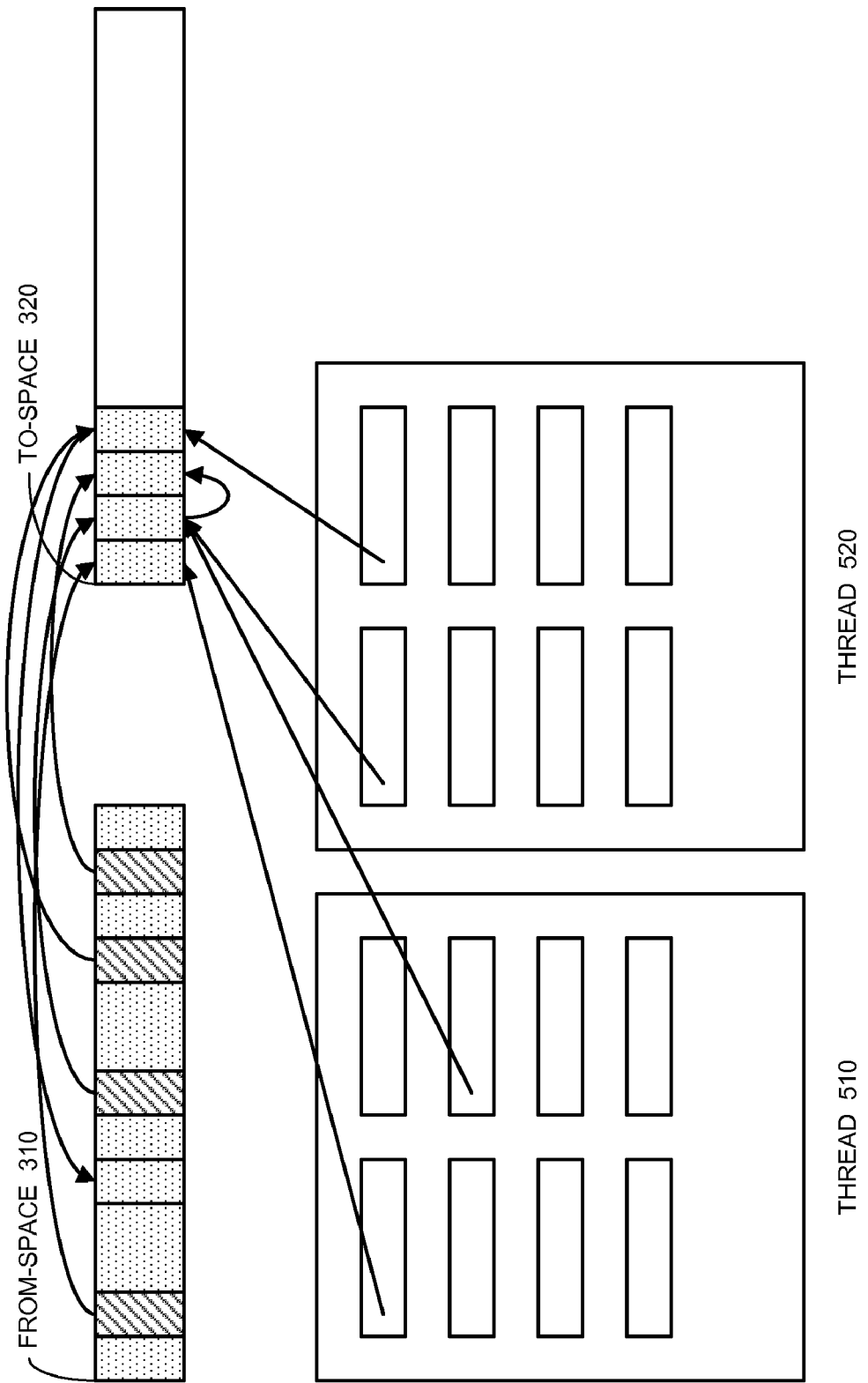

FIG. 5D illustrates the state where thread 510 is marked as Clean, and collector 140 begins cleaning thread 520. Note that as described previously, a thread is marked as clean when all of its pointers point to objects in to-space 320. If thread 520 is the last thread remaining to be cleaned, at this time there will be no more mutations of from-space 310.

Figure 5E:
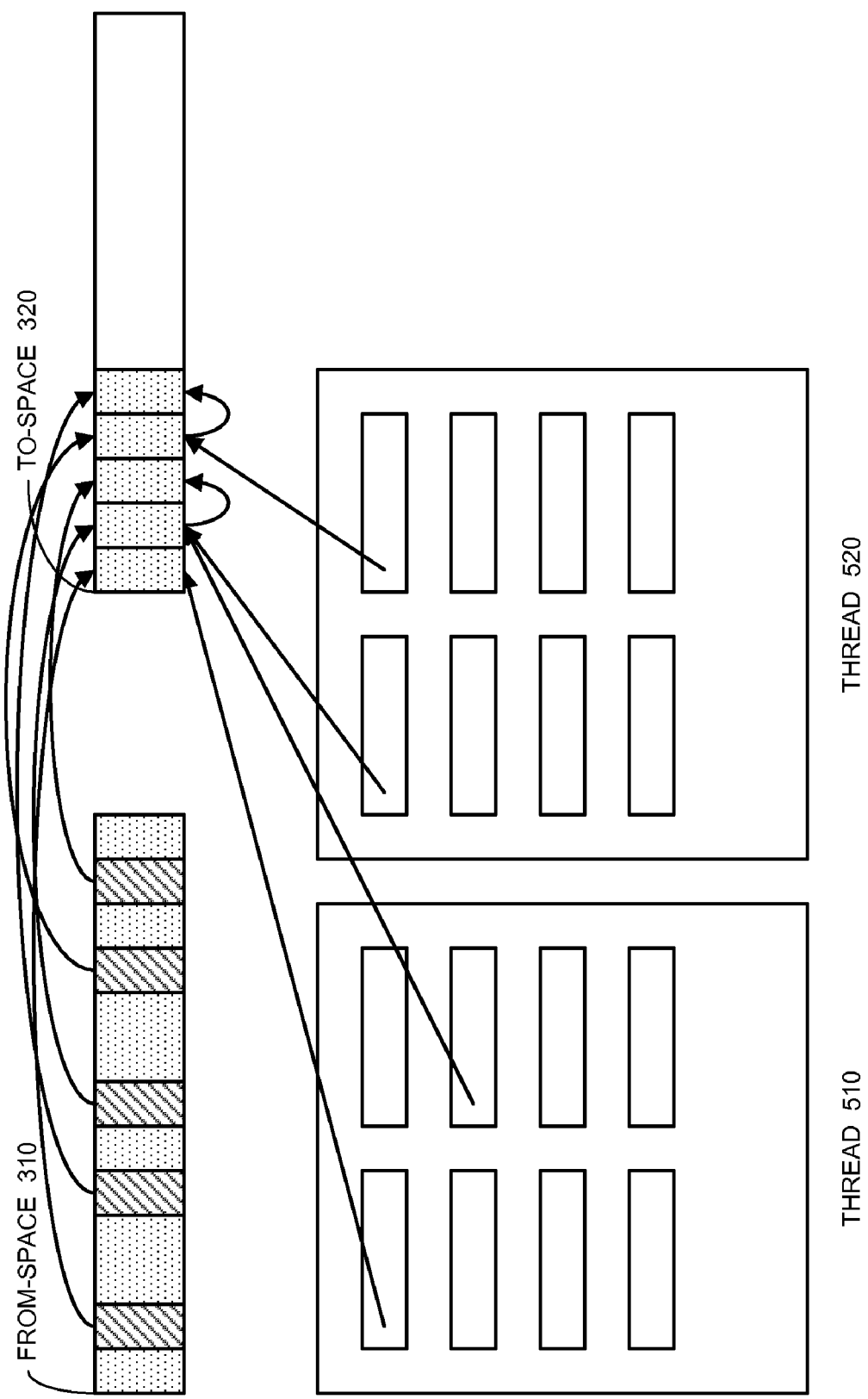

FIG. 5E illustrates the state where collector 140 completes the cleaning of to-space 320. At this point in time, everything left in from-space 310 is dead, and from-space 310 can be recycled. Additionally, as described previously, from-space 310 can now become the new to-space, and to-space 320 can now become the new from-space for a subsequent garbage-collection operation.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing concurrent garbage collection, the method comprising:
   executing a first mutator thread;
   while executing the first mutator thread, performing a garbage-collection operation using a garbage-collector thread, wherein performing the garbage-collection operation involves:
      discovering a first live object in a from-space, which is being collected;
      marking cache lines comprising the first live object in the from-space as "forwarded," which prevents any mutator threads from touching the cache lines;
      creating a copy of the first live object in a to-space, where live objects are copied to during garbage collection; and
      replacing the first live object in the from-space with a first forwarding pointer which points to a first location of the copy of the first live object in the to-space.

2. The method of claim 1, wherein performing the garbage-collection operation further involves:
   examining the copy of the first live object in the to-space to identify a first pointer to a first location in the from-space;
   if such a first pointer is identified, determining if a second live object exists at the first location in the from-space pointed to by the first live object in the to-space, and if so, moving the second live object to a second location in the to-space; and
   replacing the first pointer to the first location in the from-space with a pointer to the corresponding second location in the to-space.

3. The method of claim 2, wherein moving the second live object to the second location in the to-space involves:
   creating a copy of the second live object in the second location in the to-space;
   replacing the second live object in the from-space with a second forwarding pointer which points to the second location of the copy of the second live object in the to-space;
   examining the copy of the second live object in the to-space to identify a second pointer to a second location in the from-space;
   if such a second pointer is identified, determining if a third live object exists at the second location in the from-space, and if so, moving the third live object to a third location in the to-space; and replacing the second pointer to the second location in the from-space with a pointer to the corresponding third location in the to-space.

4. A method for performing concurrent garbage collection, the method comprising:
executing a first mutator thread;
while executing the first mutator thread, performing a garbage-collection operation using a garbage-collector thread, wherein performing the garbage-collection operation involves:
discovering a live object in a from-space, which is being collected;
creating a copy of the live object in a to-space, where live objects are copied to during garbage collection;
replacing the live object in the from-space with a forwarding pointer which points to a location of the copy of the live object in the to-space;
determining if the first mutator thread holds any additional references to the from-space;
if so, leaving the first mutator thread marked as "dirty," wherein dirty is the initial state for mutator threads; and
if not, marking the first mutator thread as "clean."

5. The method of claim 4, wherein copying the live object to the to-space is performed by one of:
the garbage-collector thread; and
a first mutator thread or another mutator thread operating on behalf of the collector.

6. The method of claim 4, wherein performing the garbage-collection operation involves cleaning one or more cache lines comprising the to-space copy of the live object.

7. The method of claim 6, wherein cleaning a cache line involves:
marking the cache line as "being cleaned," wherein the initial state of the cache line is "dirty;"
determining if any pointers in the cache line point to the from-space;
if so, copying objects pointed to by the pointers to the to-space and adjusting the pointers to point to the copies of the objects in the to-space; and
once all of the pointers in the cache line point to the to-space, marking the cache line as "clean."

8. The method of claim 6, wherein once the first mutator thread has been marked as clean and all cache lines comprising the to-space copy of the live object have been cleaned, the method further comprises:
clearing the from-space; and
changing a garbage-collection phase so that the from-space becomes the to-space and the to-space becomes the from-space for a subsequent garbage-collection operation.

9. The method of claim 8, wherein the garbage-collection phase is set per mutator thread.

10. The method of claim 7, wherein the state of the cache line is stored with a coherence state of the cache line.

11. The method of claim 4, further comprising:
determining that a second mutator thread is going to perform a read operation on a cache line;
if the second mutator thread is marked as dirty and the cache line is marked as dirty or being cleaned, allowing the read operation;
if the second mutator thread is marked as dirty and the cache line is marked as forwarded, trapping the read operation;
if the second mutator thread is marked as dirty and the cache line is marked as clean, allowing the read operation;
if the second mutator thread is marked as clean and the cache line is marked as dirty or being cleaned, trapping the read operation;
if the second mutator thread is marked as clean and the cache line is marked as forwarded, throwing an exception; and
if the second mutator thread is marked as clean and the cache line is marked as clean, allowing the read operation.

12. The method of claim 4, further comprising:
determining that a second mutator thread is going to perform a write operation on a cache line;
if the second mutator thread is marked as dirty and the cache line is marked as dirty or being cleaned, allowing the write operation and setting the cache line to dirty when the cache line is marked as being cleaned;
if the second mutator thread is marked as dirty and the cache line is marked as forwarded, trapping the write operation;
if the second mutator thread is marked as dirty and the cache line is marked as clean, allowing the write operation and setting the cache line to dirty;
if the second mutator thread is marked as clean and the cache line is marked as dirty or being cleaned, allowing the write operation;
if the second mutator thread is marked as clean and the cache line is marked as forwarded, throwing an exception; and
if the second mutator thread is marked as clean and the cache line is marked as clean, allowing the write operation.

13. A computer-readable storage medium storing instructions that when executed by a computer cause the computer to perform a method for performing concurrent garbage collection, the method comprising:
executing a first mutator thread;
while executing the first mutator thread, performing a garbage-collection operation using a garbage-collector thread, wherein performing the garbage-collection operation involves:
discovering a first live object in a from-space, which is being collected;
marking cache lines comprising the first live object in the from-space as "forwarded," which prevents any mutator threads from touching the cache lines;
creating a copy of the first live object in a to-space, where live objects are copied to during garbage collection; and
replacing the first live object in the from-space with a first forwarding pointer which points to a first location of the copy of the first live object in the to-space.

14. The computer-readable storage medium of claim 13, wherein performing the garbage-collection operation further involves:
examining the copy of the first live object in the to-space to identify a first pointer to a first location in the from-space;
if such a first pointer is identified, determining if a second live object exists at the first location in the from-space pointed to by the first live object in the to-space, and if so, moving the second live object to a second location in the to-space; and replacing the first pointer to the first location in the from-space with a pointer to the corresponding second location in the to-space.

15. The computer-readable storage medium of claim 14, wherein moving the second live object to the second location in the to-space involves:
    creating a copy of the second live object in the second location in the to-space;
    replacing the second live object in the from-space with a second forwarding pointer which points to the second location of the copy of the second live object in the to-space;
    examining the copy of the second live object in the to-space to identify a second pointer to a second location in the from-space;
    if such a second pointer is identified, determining if a third live object exists at the second location in the from-space, and if so, moving the third live object to a third location in the to-space; and
    replacing the second pointer to the second location in the from-space with a pointer to the corresponding third location in the to-space.

16. A computer-readable storage medium storing instructions that when executed by a computer cause the computer to perform a method for performing concurrent garbage collection, the method comprising:
    executing a first mutator thread;
    while executing the first mutator thread, performing a garbage-collection operation using a garbage-collector thread, wherein performing the garbage-collection operation involves:
        discovering a live object in a from-space, which is being collected;
        creating a copy of the live object in a to-space, where live objects are copied to during garbage collection;
        replacing the live object in the from-space with a forwarding pointer which points to a location of the copy of the live object in the to-space;
        determining if the first mutator thread holds any additional references to the from-space;
        if so, leaving the first mutator thread marked as "dirty," wherein dirty is the initial state for mutator threads; and
        if not, marking the first mutator thread as "clean."

17. The computer-readable storage medium of claim 16, wherein copying the live object to the to-space is performed by one of:
    the garbage-collector thread; and
    the first mutator thread or another mutator thread operating on behalf of the collector.

18. The computer-readable storage medium of claim 16, wherein performing the garbage-collection operation involves cleaning one or more cache lines comprising the to-space copy of the live object.

19. The computer-readable storage medium of claim 18, wherein cleaning a cache line involves:
    marking the cache line as "being cleaned," wherein the initial state of the cache line is "dirty;"
    determining if any pointers in the cache line point to the from-space;
    if so, copying objects pointed to by the pointers to the to-space and adjusting the pointers to point to the copies of the objects in the to-space; and
    once all of the pointers in the cache line point to the to-space, marking the cache line as "clean."

20. The computer-readable storage medium of claim 18, wherein once the first mutator thread has been marked as clean and all cache lines comprising the to-space copy of the live object have been cleaned, the method further comprises:
    clearing the from-space; and
    changing a garbage-collection phase so that the from-space becomes the to-space and the to-space becomes the from-space for a subsequent garbage-collection operation.

21. The computer-readable storage medium of claim 20, wherein the garbage-collection phase is set per mutator thread.

22. The computer-readable storage medium of claim 19, wherein the state of the cache line is stored with a coherence state of the cache line.

23. The computer-readable storage medium of claim 16, wherein the method further comprises:
    determining that a second mutator thread is going to perform a read operation on a cache line;
    if the second mutator thread is marked as dirty and the cache line is marked as dirty or being cleaned, allowing the read operation;
    if the second mutator thread is marked as dirty and the cache line is marked as forwarded, trapping the read operation;
    if the second mutator thread is marked as dirty and the cache line is marked as clean, allowing the read operation;
    if the second mutator thread is marked as clean and the cache line is marked as dirty or being cleaned, trapping the read operation;
    if the second mutator thread is marked as clean and the cache line is marked as forwarded, throwing an exception; and
    if the second mutator thread is marked as clean and the cache line is marked as clean, allowing the read operation.

24. The computer-readable storage medium of claim 16, wherein the method further comprises:
    determining that a second mutator thread is going to perform a write operation on a cache line;
    if the second mutator thread is marked as dirty and the cache line is marked as dirty or being cleaned, allowing the write operation and setting the cache line to dirty when the cache line is marked as being cleaned;
    if the second mutator thread is marked as dirty and the cache line is marked as forwarded, trapping the write operation;
    if the second mutator thread is marked as dirty and the cache line is marked as clean, allowing the write operation and setting the cache line to dirty;
    if the second mutator thread is marked as clean and the cache line is marked as dirty or being cleaned, allowing the write operation;
    if the second mutator thread is marked as clean and the cache line is marked as forwarded, throwing an exception; and
    if the second mutator thread is marked as clean and the cache line is marked as clean, allowing the write operation.

* * * * *